United States Patent [19]

Kimber et al.

[11] Patent Number: 5,375,233
[45] Date of Patent: Dec. 20, 1994

[54] FILE SYSTEM

[75] Inventors: Susan P. Kimber, The Brackens Crowthorne; Andrew J. McPhee, Emmer Green Reading; John C. Moor, Wokingham, all of Great Britain

[73] Assignee: International Computers Limited, Putney, England

[21] Appl. No.: 864,149

[22] Filed: Apr. 6, 1992

Related U.S. Application Data

[63] Continuation of Ser. No. 800,765, Dec. 2, 1991, abandoned, which is a continuation of Ser. No. 451,514, Dec. 14, 1989, abandoned.

Foreign Application Priority Data

Dec. 22, 1988 [GB] United Kingdom ................. 8829919

[51] Int. Cl.$^5$ ..................... G06F 13/00; G06F 12/00
[52] U.S. Cl. ................. 395/600; 364/DIG. 1; 364/227.81; 364/222.82; 364/246; 364/246.3
[58] Field of Search ................. 364/DIG. 1, DIG. 2; 395/600, 400, 425, 275

[56] References Cited

U.S. PATENT DOCUMENTS

| | | | |
|---|---|---|---|
| 4,121,286 | 10/1978 | Venton et al. | 395/425 |
| 4,164,026 | 8/1979 | Almasi et al. | 365/3 |
| 4,435,752 | 3/1984 | Winkelman | 395/600 |
| 4,536,837 | 8/1985 | Olson et al. | 395/600 |
| 4,800,550 | 1/1989 | Yamauchi | 369/59 |
| 4,843,570 | 6/1989 | Sugitani | 364/518 |
| 4,849,878 | 7/1989 | Roy | 395/600 |
| 4,945,475 | 7/1990 | Bruffey et al. | 395/600 |
| 4,947,367 | 8/1990 | Chang et al. | 395/500 |
| 5,021,946 | 6/1991 | Korty | 395/600 |

FOREIGN PATENT DOCUMENTS

| | | |
|---|---|---|
| 1138363 | 6/1986 | Japan. |
| 2221048 | 9/1987 | Japan. |
| 2236049 | 10/1987 | Japan. |

OTHER PUBLICATIONS

Bic et al. "The Logical Design of Operating System" 1988 p. 210-216.
Philip D. L. Koch, "Disk File Allocation Based on the Buddy System" ACM Transactions on Computer Systems vol. 5, No. 4, Nov. 1987 pp. 352-370.
Margo Seltzer et al. "Read Optimized File System Design: A Performance Evaluation" 1991 pp. 602-611.
"A Modular Operating System for the CRAY-1", Jeffrey C. Huskamp, Software Practice and Experience, vol. 16(12), Dec. 1986, pp. 1059-1076.
"A Fast File System for UNIX", Marshall K. McKusick, et al., AMC Transactionss on Computer Systems, vol. 2, No. 3, Aug. 1984, pp. 181-197.

*Primary Examiner*—Allen R. MacDonald
*Assistant Examiner*—Ayaz R. Sheikh
*Attorney, Agent, or Firm*—Lee, Mann, Smith, McWilliams, Sweeney & Ohlson

[57] ABSTRACT

A disc file system is described in which the disc space is divided into very large blocks of at least 64k bytes. A large file is allocated a whole number of these large blocks, contiguously where possible. Small files reside in small file areas each of which is composed of a number of large blocks. Space in these small file areas is allocated in multiples of a small block size (e.g. 4K bytes). The use of large and small blocks reduces the wastage of space that would occur if small files were written into large blocks. The amount of head movement when reading large amounts of data from large files is reduced because of the large block size and because the large blocks are allocated contiguously.

3 Claims, 3 Drawing Sheets

008E# FILE SYSTEM

This application is a continuation of application Ser. No. 800,765, filed Dec. 2, 1991, now abandoned, which is a continuation of application Ser. No. 451,514, filed Dec. 14, 1989, now abandoned.

BACKGROUND OF THE INVENTION

This invention relates to file systems and is particularly concerned with allocation of space in a file system such as, for example, a disc file system.

In one conventional form of disc file system, the available data storage space is divided into fixed size blocks of 512 or 1024 bytes, and these blocks are allocated to files as required. A problem with this, however, is that it is unlikely that the blocks allocated to a particular file will be contiguous on the disc, and the blocks are small compared with the size of a typical large file. Thus, if a large amount of data needs to be read from the disc, there will be much disc head movement, which reduces the rate at which the data can be read.

One way of alleviating this problem would be to increase the block size, so as to increase the degree of contiguity of the files, and thereby to reduce the amount of head movement. However, increasing the block size leads to the further problem that small files (i.e. those significantly smaller than the block size) would waste an unacceptable amount of space.

Various compromise schemes have been proposed, but in general the filestore eventually becomes fragmented so that little contiguous space is available, and some tidying up process is required.

The object of the present invention is to provide an improved file system in which the above problems are overcome.

SUMMARY OF THE INVENTION

According to the invention there is provided a method of storing files in a file system comprising the steps:
a) dividing the file system into large blocks,
b) designating each file as a large file or a small file,
c) dynamically allocating a whole number of said large blocks to each large file,
d) dynamically creating at least one small file area consisting of a whole number of said large blocks, subdivided into small blocks, and
e) dynamically allocating a whole number of small blocks from the small file area or areas to each small file.

DESCRIPTION OF AN EMBODIMENT OF THE INVENTION

One data processing system embodying the invention will now be described by way of example with reference to the accompanying drawings.

Figure 1:
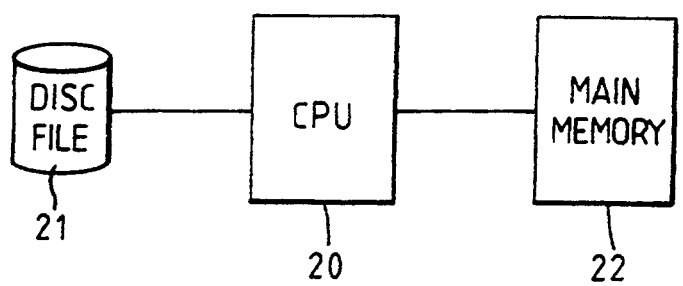
FIG. 1 is a block diagram of an example of a data processing system including a file system embodying the present invention.

Referring to FIG. 1, the data processing system comprises a central processing unit (CPU) 20, a magnetic disk file unit 21, and a main memory 22.

The disc file unit 21 is a 360 Mbyte fixed disc unit. When the system is created, the file system (which may occupy the whole or part of the disc) is created. The available disc storage space within the file system is divided into large blocks of a predetermined size. The large block size can be specified by the user according to the expected size of the files to be stored in the system, and is at least 64Kbytes. In the following description it will be assumed that a large block size of 256 Kbytes has been selected.

Whenever a file is created in the system, it is designated as either a large file or a small file.

Large files are allocated large blocks as they need them. Wherever possible, the large blocks allocated to a particular large file are chosen to be contiguous on the disc.

Small files reside in a set of small file areas, each of which is composed of a number of large blocks. Each large block is subdivided into small blocks. The size of the small blocks is also configurable by the user. In the following description, it will be assumed that a small block size of 4Kbytes has been selected. Space in any small file area is allocated in multiples of the small block size. (4Kbytes). There may be only one small file area in the system, or a plurality of separate small file areas. In this example, it is assumed that each small file area consists of two large blocks.

Figure 2:
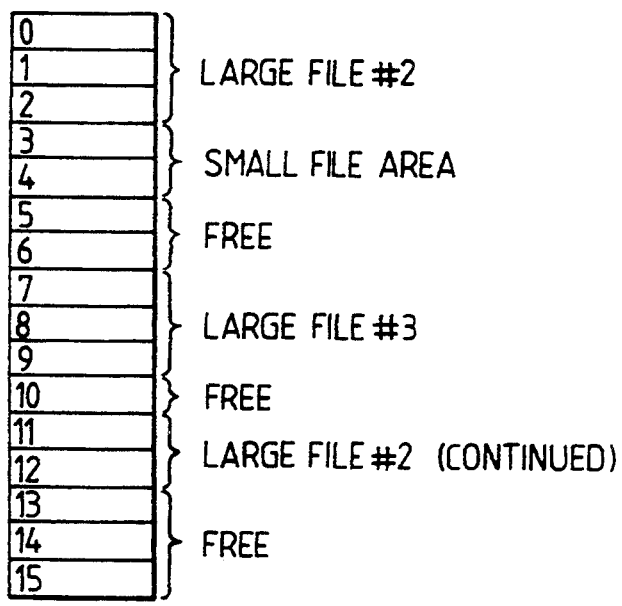
FIG. 2 is a schematic diagram illustrating the way in which blocks are allocated to files.

By way of example, FIG. 2 shows a schematic view of a disc file holding sixteen large blocks, numbered 0-15. (Of course, normally there would be many more blocks in the system).

In this example, a large file (Large file 2) has been allocated blocks 0, 1 and 2 initially, and then has later been allocated further blocks 11 and 12. Another large file (Large file No. 3) has been allocated blocks 7, 8 and 9.

Blocks 3 and 4 have been designated as a small file area, and hold a number of small files (not illustrated) each consisting of a whole number of small blocks.

Blocks 5, 6, 10, 13, 14 and 15 are free, either because they have not yet been used, or because they were allocated to a file that has now been deleted.

The file store is viewed as consisting of a number of fragments, where a fragment is defined as a contiguous set of large blocks with the same use or owner. A fragment can be either:
a) an area of free space
b) part of a large file or
c) a small file area.

For example, in FIG. 2, the file store contains seven fragments, consisting of the blocks (0, 1, 2), (3, 4), (5, 6), (7, 8, 9), (10), (11, 12) and (13, 14, 15).

In operation, the file system maintains on the disc a fragment list, containing an entry for each fragment in the system. Each entry consists of four fields as follows:
START: the address of the first large block in the fragment.
SIZE: the number of large blocks in the fragment.
I/D: this has the following meanings.

0 = free space
1 = small file area
2, 3 . . . = identity of large file.

PART: a part number for a large file that is split into a number of fragments.

For example, referring to FIG. 2, the fragment (11, 12) will have:
START = 11 (since it starts at block 11)
SIZE = 2 (since it consists of two large blocks)
I/D = 2 (since it is part of large file 2)
PART = 2 (since it is the second part of that file).

Whenever the file system is introduced to the data processing system, the fragment list is copied into the main memory. The fragment list is then scanned and a linked list table is created in main memory having an entry for each fragment in the file store. Each entry comprises forward and backward physical and logical pointers, pointing to other fragments together with a pointer to the fragment list entry.

The physical pointers chain the fragments together in their physical order on the disc. For example, referring to FIG. 2, the forward physical pointer for fragment (0, 1, 2) points to the fragment (3, 4) since this is physically the next fragment on the disc. Thus, the physical pointers provide a map of the physical organisation of the file system. The forward and backward logical pointers have the following meanings.

a) If the fragment is part of a large file, they point to the next and previous fragments of that large file. Thus, the fragments of each large file are linked together in logical order into a separate chain.

b) If the fragment is free space, the forward logical pointer points to the next largest free space fragment, and the backward logical pointer points to the next smallest free space fragment. Thus, all the free space fragments are linked together in order of increasing and decreasing size.

c) If the fragment is a small file area, then the forward logical pointer points to the next small file area (in chronological order of allocation) or is NULL if there are no more. The backward logical pointer references the free block list within that area.

Figure 3:
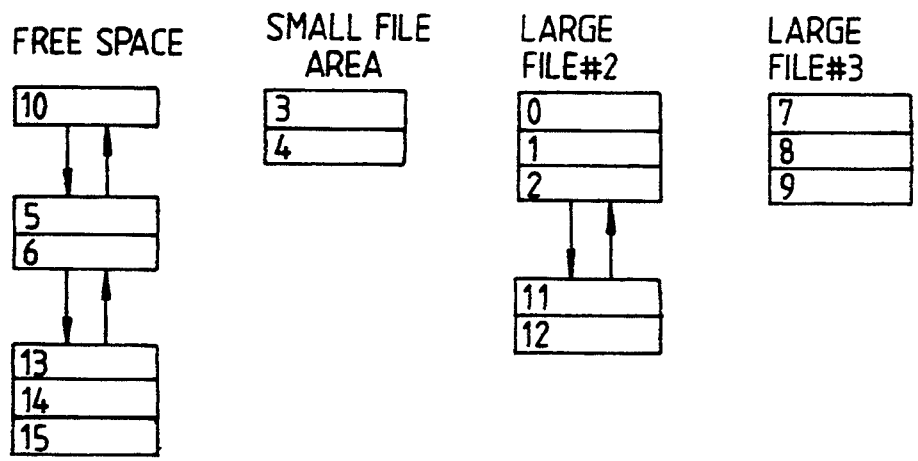
FIG. 3 is a schematic diagram illustrating the way in which blocks are linked together.

As an example, FIG. 3 shows the way in which the fragments in FIG. 2 are linked together by the logical pointers.

It can be seen that the free space fragments (10), (5, 6) and (13, 14, 15) are linked together in order of increasing and decreasing size. For example, the forward logical pointer of fragment (10) points to fragment (5, 6), and so on.

Similarly, the two fragments (0, 1, 2) and (11, 12) of the large file 2 are linked together in logical order.

Each small file area contains a free block list indicating which small blocks are free within that area.

File Extend

Figure 4:
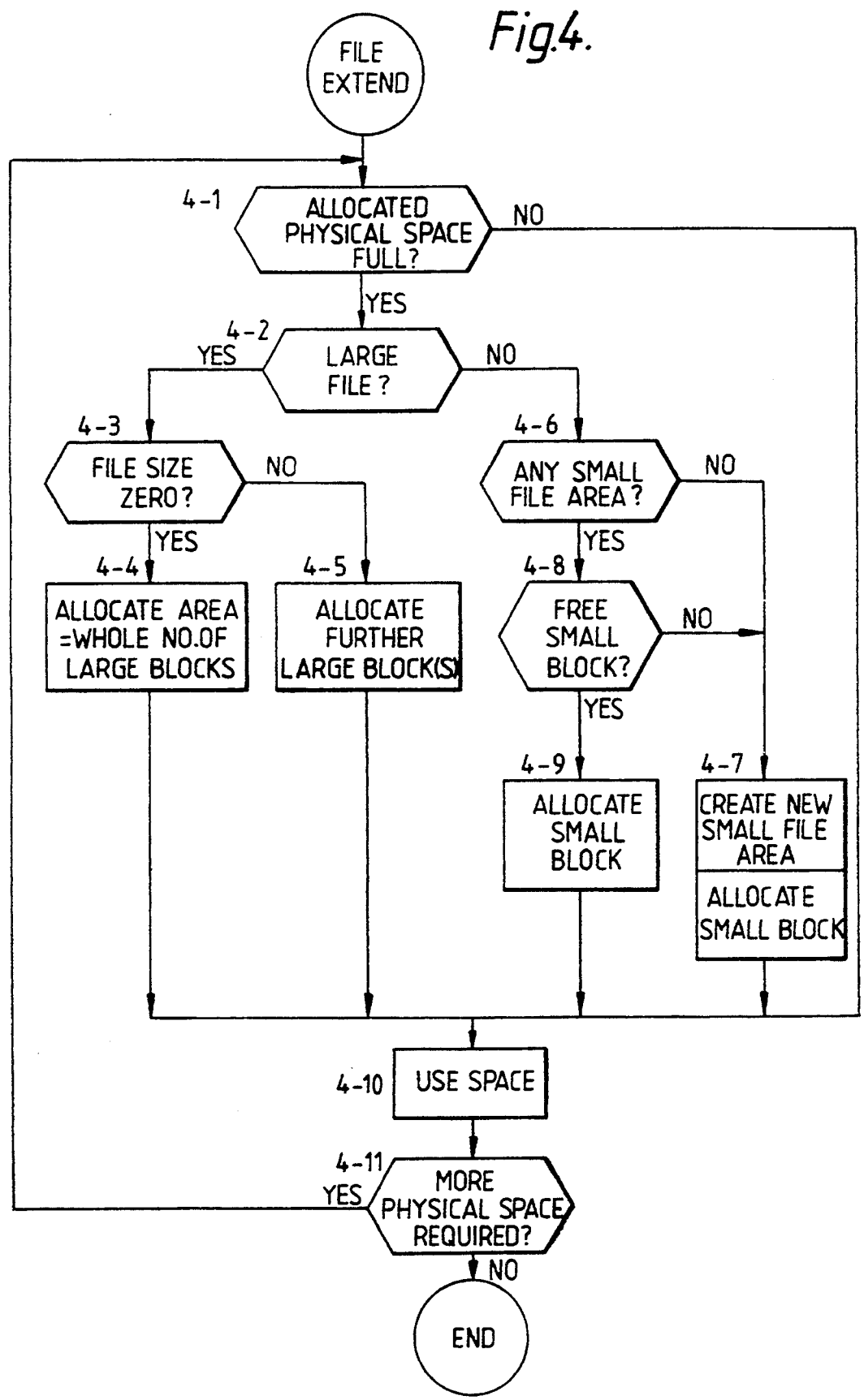
FIG. 4 is a flow chart showing the operation of the system when writing to file.

Referring now to FIG. 4, this shows the operation of the file system when a file is extended.

(4-1) A test is made to determine whether all the physical space (if any) already allocated to the file has been used up.

(4-2) If all the allocated space is full (or if no space has yet been allocated to this file) then the file is examined to determine whether it has been designated as a large file.

(4-3) If it is a large file, a test is made to determine whether the file size is zero.

(4-4) If the file size is zero, this means that the file has not yet been allocated any space on the disc.

The list of free space fragments is therefore scanned to find, if possible, a contiguous area of free space large enough for the file. A whole number of free large blocks is then allocated to the file.

For example, in the situation shown in FIGS. 2 and 3, if a new file requires two large blocks, then blocks 5 and 6 can be allocated to it.

The fragment list and linked list entries are updated accordingly.

(4-5) If the file size is not zero the file must already have been allocated an area on the disc, but this is now full. At least one further large block is therefore allocated to the file. (This is likely to be much larger than the actual space requested and hence provides room for further expansion). The new area should, wherever possible, be contiguous with the rest of the file. This is achieved by examining the physical pointers in the linked list to find the next fragment physically adjacent to the last logical block of the file. This fragment is tested to determine whether or not it is free and, if so, one or more blocks are allocated to the file. For example, in FIG. 2, if a write is made to large file No. 2, and there is not enough space in the area already allocated to that file, then block 13 will be allocated to the file since it is physically adjacent to the last logical block 12 of the file.

As before, the fragment list and linked list are updated accordingly.

(4-6) If the file is a small file, the following actions are performed. First, a check is made to determine whether a small file area already exists.

(4-7) If no small file area exists, one or more free large blocks are allocated to form a new small file area. The number of large blocks in each small file area is predetermined by the system user; in this example, it is assumed that each small file area consists of two large blocks. Where the small file area consists of more than one large block, these are allocated as contiguous blocks.

The fragment list and linked list are updated accordingly.

The small file is then allocated one or more small (4Kbyte) blocks in this new small file area.

(4-8) If a small file area already exists, the free block list of that area is examined to determine whether there are any free small blocks in the small file area. If there are no free small blocks, a new small File area is created as described above, and the file is allocated a small block from that area.

(4-9) If on the other hand there is at least one free small block in the existing small file area, it is allocated to the file, and the free block list is updated. The small blocks allocated to any particular small file need not necessarily be contiguous (4-10) When space has been allocated to a file, or alternatively if it was found at step 4-1 above that there was still free space in the area already allocated to the file, then this space (or as much as is necessary) is used.

(4-11) A test is then made to determine whether more physical space is required. If not, the file extend procedure is terminated. Otherwise, the procedure returns to step 4-1 above, and this loop is repeated until the file extend is complete.

Delete File

Figure 5:
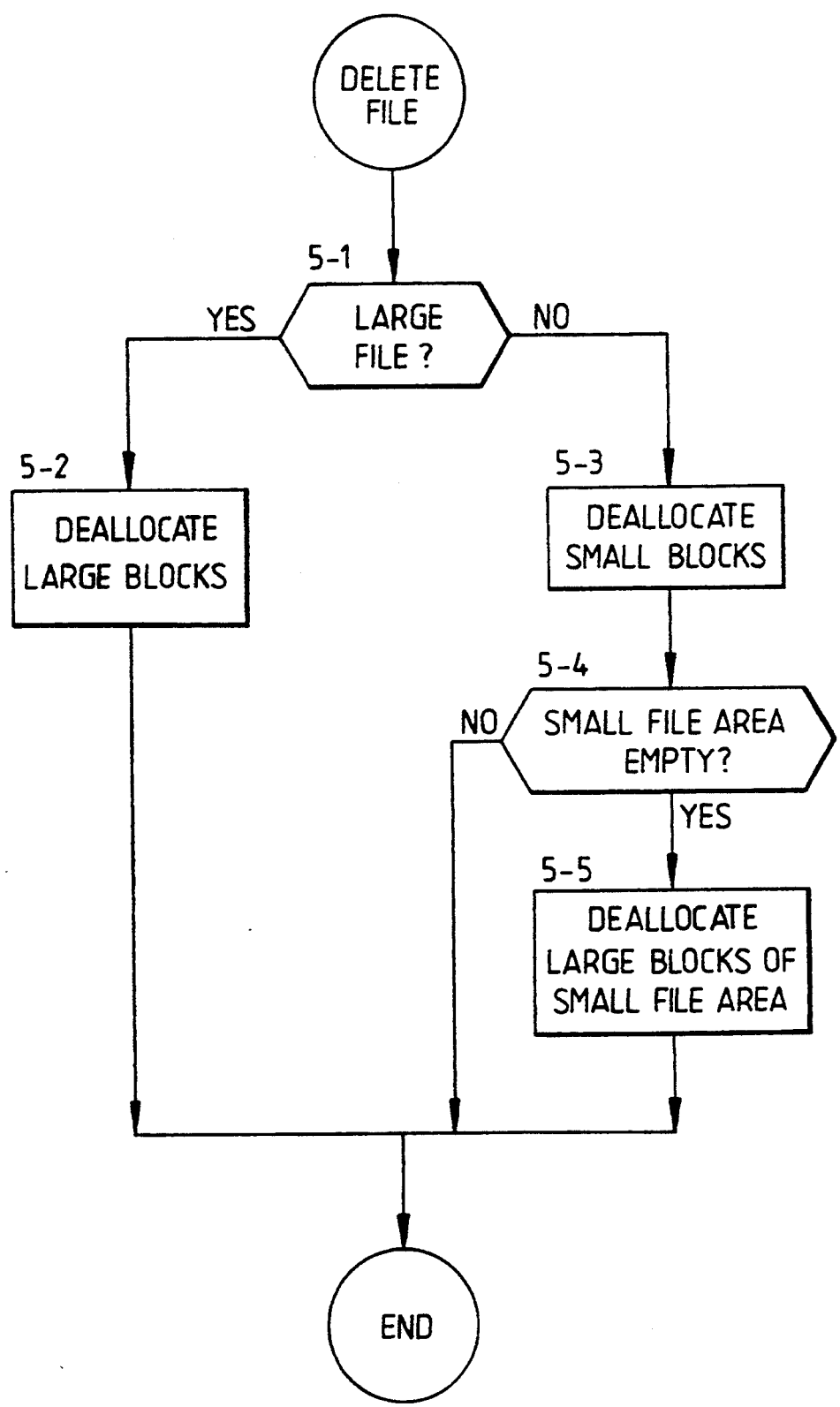
FIG. 5 is a flow chart showing the operation of the system when deleting a file.

Referring now to FIG. 5, this shows the operation of the file system when a file is to be deleted.

(5-1) First, a test is made to determine whether this is a large file.

(5-2) If it is a large file, then all the large blocks allocated to that file are deallocated, by adding them to the list of free space fragments.

(5-3) If on the other hand the file is small, the small blocks allocated to that file are deallocated, by updating the free block list of the small file area in which they reside.

(5-4) The free block list of the small file area is then examined to determine whether the whole of that area is now free.

(5-5) If it is, then the whole of that small file area is deallocated by adding the large blocks that make up the area to the list of free space fragments.

It will be appreciated that the file systems operations described above, including the file write and delete operations shown in FIGS. 4 and 5, may conveniently be implemented by software or firmware, running on the CPU 20 (FIG. 1). This software or firmware could also run on any processor which controls the disc and which is subsidiary to the main CPU.

In summary it can be seen that space on the disc is allocated and deallocated dynamically, as the need arises. Initially, all the large blocks are free, and form a single free space fragment. Large blocks are allocated to large files as required. Small file areas are created when needed to hold small files. In some implementations it may be necessary to create a small file area during the creation process.

The system described above thus provides a two-tier system with large and small blocks for large and small files. This reduces the wastage of space that would occur if small files were written into large blocks. The very large size of the large blocks ensures that large amounts of data can be stored contiguously and therefore can be read from the disc without excessive head movement. Moreover, the amount of head movement is further reduced by the fact that large files are allocated contiguous blocks wherever possible.

In a possible modification the system may be extended to three or more tiers, each with a different block size.

We claim:

1. In a data processing apparatus, a method of storing data files in a disk file wherein each of said files when it is created is designated as a large file or a small file and wherein said disk file contains storage space comprising a plurality of large blocks of equal size, the method comprising creating at least one small file area on demand when required, each said small file area being created out of an integral number of said large blocks, each large block in each small file area being divided into a plurality of small blocks, the method further comprising extending a data file by means of the following steps:

(a) operating the data processing apparatus to determine whether the file to be extended has been designated when it was created as a large file or a small file, (b) in the event that the apparatus determines that the file to be extended has been designated as a large file, allocating an integral number of said large blocks to that file, (c) in the event that the apparatus determines that the file to be extended has been designated as a small file and there exists available free space in an existing small file area, allocating an integral number of said small blocks from said existing small file area to the file to be extended, and (d) in the event that the apparatus determines that the file to be extended has been designated as a small file and no available free space exists in an existing small file area, creating a new small file area and allocating an integral number of small blocks from said new file area to the file to be extended, (e) whereby files designated as large files are extended only by addition of large blocks and files designated as small files are extended only by addition of small blocks.

2. A method according to claim 1 wherein each said large block is at least 64 Kbytes in size.

3. A method according to claim 1 wherein each said large file is allocated physically contiguous large blocks wherever possible.

* * * * *